(12) United States Patent
Takamura

(10) Patent No.: US 6,706,434 B2
(45) Date of Patent: Mar. 16, 2004

(54) FUEL CELL SYSTEM

(75) Inventor: Tousaku Takamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 171 days.

(21) Appl. No.: 09/781,300

(22) Filed: Feb. 13, 2001

(65) Prior Publication Data

US 2001/0016275 A1 Aug. 23, 2001

(30) Foreign Application Priority Data

Feb. 18, 2000 (JP) .................................. P2000-041192

(51) Int. Cl.[7] ................................................ H01M 8/04
(52) U.S. Cl. .............................. 429/22; 429/26; 429/19; 429/24
(58) Field of Search .............................. 429/17, 13, 26, 429/19, 12; 423/650, 651; 422/188, 198

(56) References Cited

U.S. PATENT DOCUMENTS 5,989,739 A   11/1999   Zur Megede et al.
6,086,839 A * 7/2000   Autenrieth et al. ......... 423/350
6,280,864 B1 * 8/2001   Towler et al. ................. 429/17

FOREIGN PATENT DOCUMENTS

| EP | 0 913 357 A1 | 5/1999 |
|---|---|---|
| JP | 56-159069 A | 12/1981 |
| JP | 8-47621 A | 2/1996 |
| JP | 08-106914 | 4/1996 |
| JP | 9-63619 A | 3/1997 |
| JP | 11-086893 | 3/1999 |
| WO | WO 98/00878 A1 | 1/1998 |

* cited by examiner

Primary Examiner—Stephen Kalafut
Assistant Examiner—R Alejandro
(74) Attorney, Agent, or Firm—Foley & Lardner

(57) ABSTRACT

Reforming fuel and oxidizing agent are first supplied to the reformer when the system is started, and a rise in temperature by a partial oxidation reaction is begun. Furthermore, the reforming fuel and the oxidizing agent are supplied to a combustor, and a rise in temperature of the combustor is begun simultaneously with the rise in the temperature of the reformer.

6 Claims, 4 Drawing Sheets

FUEL CELL SYSTEM

BACKGROUND OF THE INVENTION

The present invention relates to a fuel cell system, more particularly to a fuel cell system capable of shortening a starting time.

This kind of the fuel cell system is an apparatus to convert energy of a fuel to electric energy directly, and supplies hydrogen rich gas to a cathode (fuel electrode) side of a pair of electrodes, each of which is provided so as to interpose an electrolytic film therebetween. At the same time, the fuel cell system supplies oxygen-containing gas such as the air to an anode (oxidizing agent electrode) side thereof. Thus, the fuel cell system utilizes the following chemical reactions, which occur on surfaces of the pair of the electrodes, which face the electrolytic film, thus taking out the electric energy from the electrodes (refer to Japanese Patent Laid-Open No. H8-106914).

Cathode reaction: $H_2 \rightarrow 2H^+ + 2e^-$

Anode reaction: $2H^+ + 2e^- + (\frac{1}{2})O_2 \rightarrow H_2O$

As an apparatus for generating hydrogen rich gas serving as an electromotive fuel, a reformer, which performs a steam reforming of methanol to convert the methanol into fuel gas containing hydrogen abundantly, is used. As an apparatus for generating oxidizing agent gas containing oxygen, a compressor, which takes in air to produce the compressed air, is used. While supplying the compressed air to the anode of the fuel cell after cooling the compressed air from the compressor by an after cooler, methanol gas is fed to the reformer from a fuel tank, and the hydrogen rich gas reformed by the reformer is supplied to the cathode of the fuel cell.

Since the fuel cell system is more advantageous in terms of a gas mileage and conditions for preparing infrastructures for fuels than an electromobile driven by a secondary cell, an adoption of the fuel cell system to a driving power source for use in an automobile is considered.

SUMMARY OF THE INVENTION

However, to adopt the fuel cell system to the driving power source for use in the automobile, the shortening of the starting time is one of subjects to be solved, and how to generate hydrogen rich gas quickly is particularly a question.

A fuel cell system disclosed in Japanese Patent Laid-Open No. H11-86893 aims at shortening of a starting time of a reforming apparatus. This gazette proposes a technology in which in starting the system, reforming fuel fed by a fuel pump is burnt by the use of a burner, and an evaporator for evaporating the reforming fuel, followed by rising temperature of a reforming heat portion by exhaust gas. At this time, to rise the temperature of the reforming heat portion quickly, a technology is also proposed, in which the fuel is supplied to the burner excessively or the fuel is directly sprayed to the heat portion for heating a reforming portion by the exhaust gas via a nozzle, a catalyst is coated on a surface of a case of the heat portion, and the fuel is burnt on the surface of the case thereof, thus rising temperature of the reforming portion from the outside by heat generated by burning the fuel.

However, in this fuel cell system, the burner is first started and the temperature thereof is risen, and the evaporator is heated to a higher temperature by combustion gas from the burner. Thereafter, the reforming portion is heated by the combustion gas. Accordingly, since such starting procedures are adopted, that is, since the temperature of the reforming portion is risen after the rise of the temperatures of the burner and the evaporation, there is a problem that the starting time is taken longer by a time required for the reforming portion to rise its temperature.

The present invention has been made in view of the problems of the earlier technologies, and the object of the present invention is to provide a fuel cell system capable of more shortening the starting time.

To achieve the above-described object, a fuel cell system of the present invention is provided with a reformer generating hydrogen-containing gas used for starting fuel, wherein reforming fuel and oxidizing agent are first supplied to the reformer in starting the fuel cell system, and a rise in temperature is started in response to a partial oxidation reaction of the hydrogen-containing gas with the reforming fuel and the oxidizing agent.

In other words, a fuel cell system of the present invention is provided with reforming means for generating hydrogen-containing gas used as starting fuel, wherein reforming fuel and oxidizing agent are first supplied to said reforming means when said fuel cell system is started, and a rise in temperature is begun by a partial oxidation reaction of the reforming fuel and the oxidizing agent.

Beside, a method of controlling a fuel cell system having a reformer which generates hydrogen-containing gas used as starting fuel of the present invention produces first supplying reforming fuel and oxidizing agent when said fuel cell system is started and beginning a rise in temperature by a partial oxidation reaction of the reforming fuel and the oxidizing agent.

The partial oxidization reaction equation of the present invention is as follows:

$$CH_3OH + \frac{1}{2}O_2 \rightarrow 2H_2 + CO_2 + 189.5 \text{ KJ/mol}.$$

The self-heating of this partial oxidation reaction makes it possible to rise the temperature of the whole of the reforming system and to start the reforming system in a short time. As a result, shortening of the starting time of the fuel cell system can be achieved.

Note that, at this time, a heat value can be further increased by making the ratio of the supplied oxidizing agent to the reforming fuel larger than that at a normal operation.

DETAILED DESCRIPTION OF THE PREFERRED EMBODIMENT

Hereinbelow, an embodiment of the present invention is described with reference to the drawings.

First Embodiment

Figure 1:
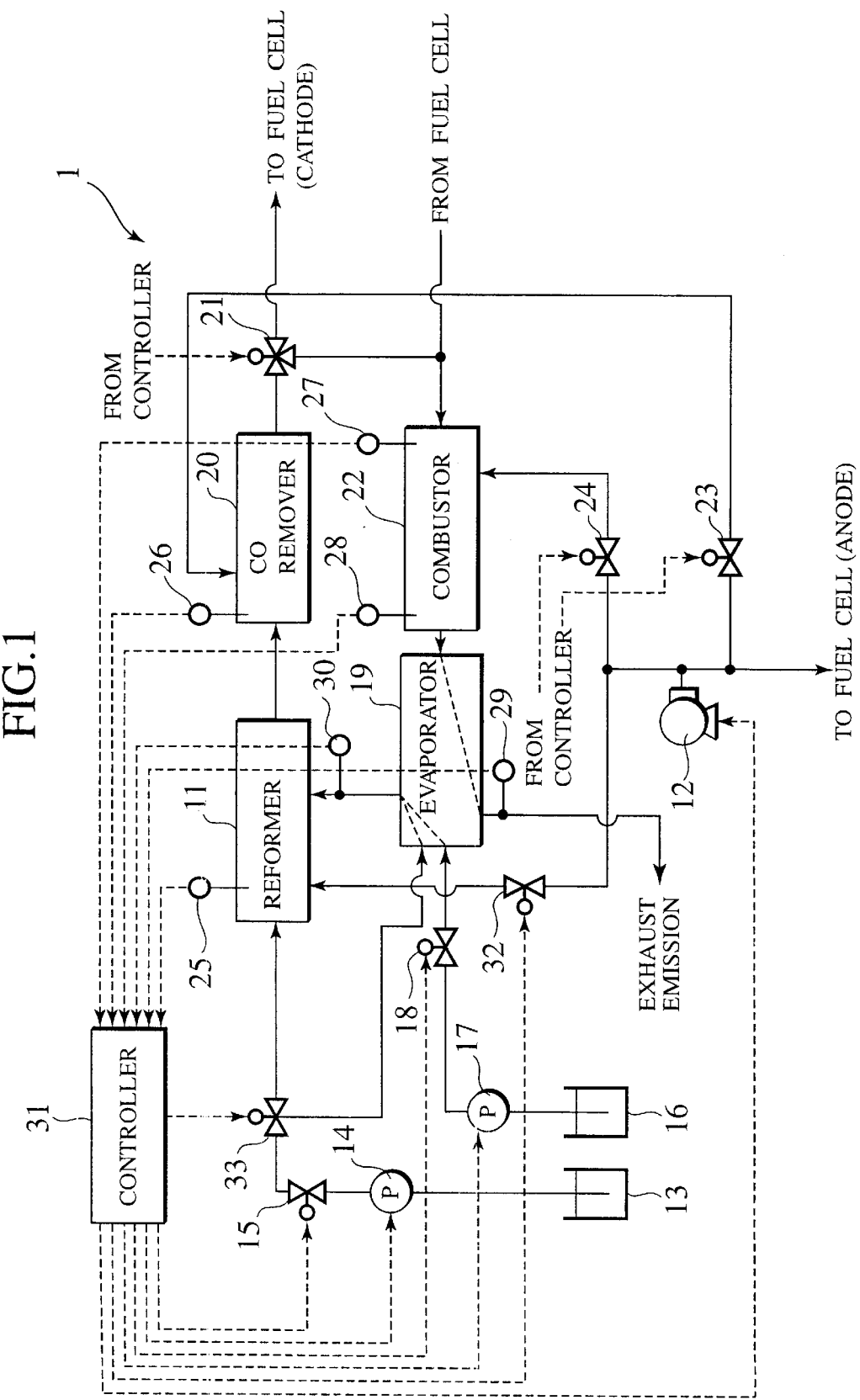
FIG. 1 is a block diagram showing an embodiment of a fuel cell system of the present invention.

FIG. 1 is a block diagram showing principal parts of a fuel cell system of the present invention. A fuel cell system 1 in the embodiment comprises a reformer 11 for generating hydrogen rich gas to be supplied to a cathode (fuel electrode) side of a fuel cell stack (not shown) and a compressor 12 for generating air to be supplied to an anode (oxidizing agent electrode) side of the fuel cell stack.

The reformer 11 allows a reforming fuel that is hydrogen carbon such as methanol, oxidizing agent and steam to react with each other in the presence of a catalyst, thus obtaining hydrogen rich gas, and the methanol that is the reforming fuel is supplied to the reformer 11 from a fuel tank 13 by a pump 14. Methanol liquid is supplied to the reforming catalyst under the condition that the methanol liquid is atomized by a spray nozzle (not shown). On the other hand, the air that is the oxidizing agent is supplied to the reformer 11 from the compressor 12, and water in a tank 16 is evaporated by an evaporator 19 to be supplied to the reformer 11 as steam. Note that reference numeral 15 donates a flow rate adjusting valve for adjusting a feed rate of methanol, reference numeral 18 denotes a flow rate adjusting valve for adjusting a feed rate of the steam, and reference numeral 32 denotes a flow rate adjusting valve for adjusting a feed rate of the air.

To prevent the fuel cell stack from being corrupted, on the downstream side of the reformer 11, provided is a carbon monoxide remover 20 for reducing carbon monoxide contained in the reforming gas, which is generated by the reformer 11, to an allowable concentration. Air from the compressor 12 is supplied to the remover 20, and carbon monoxide contained in the reforming gas is converted to carbon dioxide by selectively oxidizing carbon monoxide in the presence of the catalyst. Reference numeral 23 denotes a flow rate adjusting valve for adjusting a feed rate of the air supplied to the carbon monoxide remover 20.

A three-way valve 21 is provided in a pipe on the downstream of the carbon monoxide remover 20, and the three-way valve 21 switches a supply destination of the reformer gas between the starting time and the normal operation time. To be more specific, the reforming gas from the carbon monoxide remover 20 is supplied to a combustor 22 in the starting time, and supplied to a cathode of the fuel cell stack in the normal operation time.

In the fuel cell system 1 of this embodiment, the combustor 22 is provided, which burns the hydrogen rich gas and the like that are surplus in the fuel cell stack, and offers heat energy obtained by the burning to the evaporator 19 and the reformer 11 to be used. As described above, the reforming gas from the carbon monoxide remover 20 is supplied to the fuel cell system 1 by switching the three-way valve 21, and air as the oxidizing agent is supplied from the compressor 12 thereto. Thus, high temperature combustion gas is generated, and the combustion gas generated is supplied to the evaporator 19 provided on the downstream side of the combustor 22, whereby the evaporator 19 is heated. Finally, the combustion gas is exhausted to the outside of the system. Reference numeral 24 denotes a flow rate adjusting valve for adjusting a feed rate of air supplied to the combustor 22.

In the fuel cell system 1 of this embodiment, provided are a temperature sensor 25 for detecting a temperature of an entrance of the reformer 11, a temperature sensor 26 for detecting a temperature of an entrance of the carbon monoxide remover 20, a temperature sensor 27 for detecting a temperature of an entrance of the combustor 22, a temperature sensor 28 for detecting a temperature of an exit of the combustor 22, a temperature sensor 29 for detecting a temperature of an exit of the evaporator 19, and a temperature sensor 30 for detecting a temperature in a supply pipe communicated with the reformer 11 to confirm an arrival of steam supplied to the reformer 11. Detection signals from the respective temperature sensors are sent to a controller 31.

The compressor 12, the pumps 14 and 17, the flow rate adjusting valves 15, 18, 23, 24, and 32, and the three-way valve 21, which are described above, are controlled by the controller 31.

Next, an operation of the fuel cell system 1 of this embodiment will be described.

Figure 2:
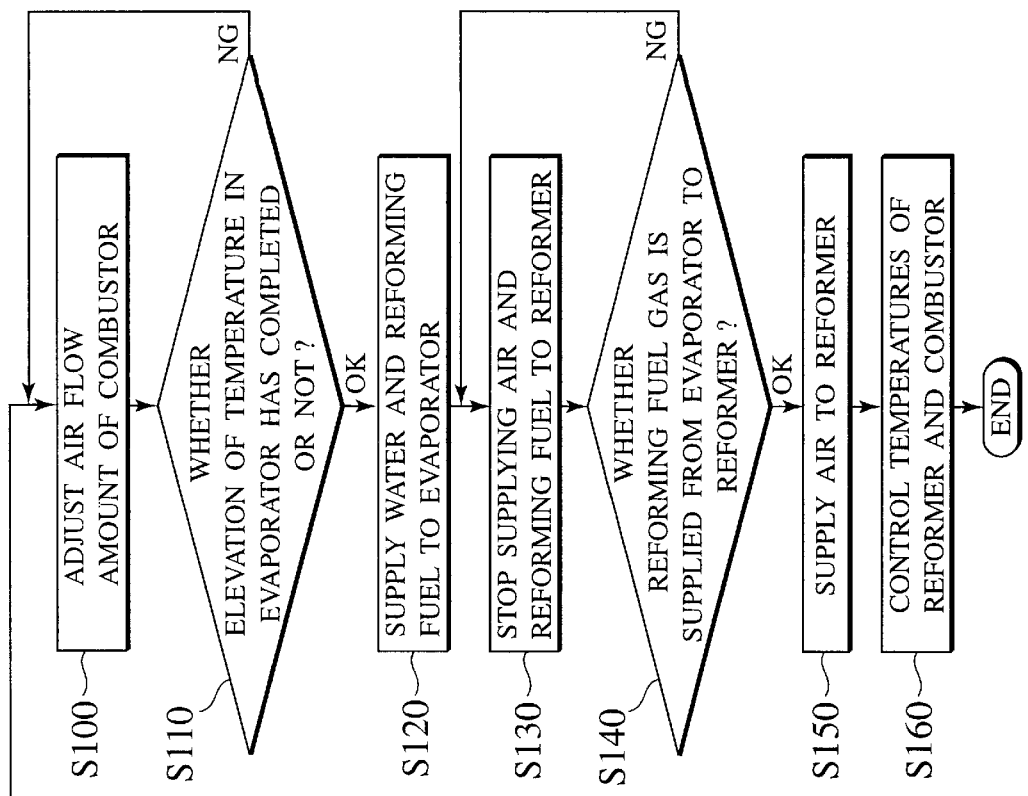
FIG. 2 is a flow chart showing starting procedures of the fuel cell system in FIG. 1.
Figure 2:
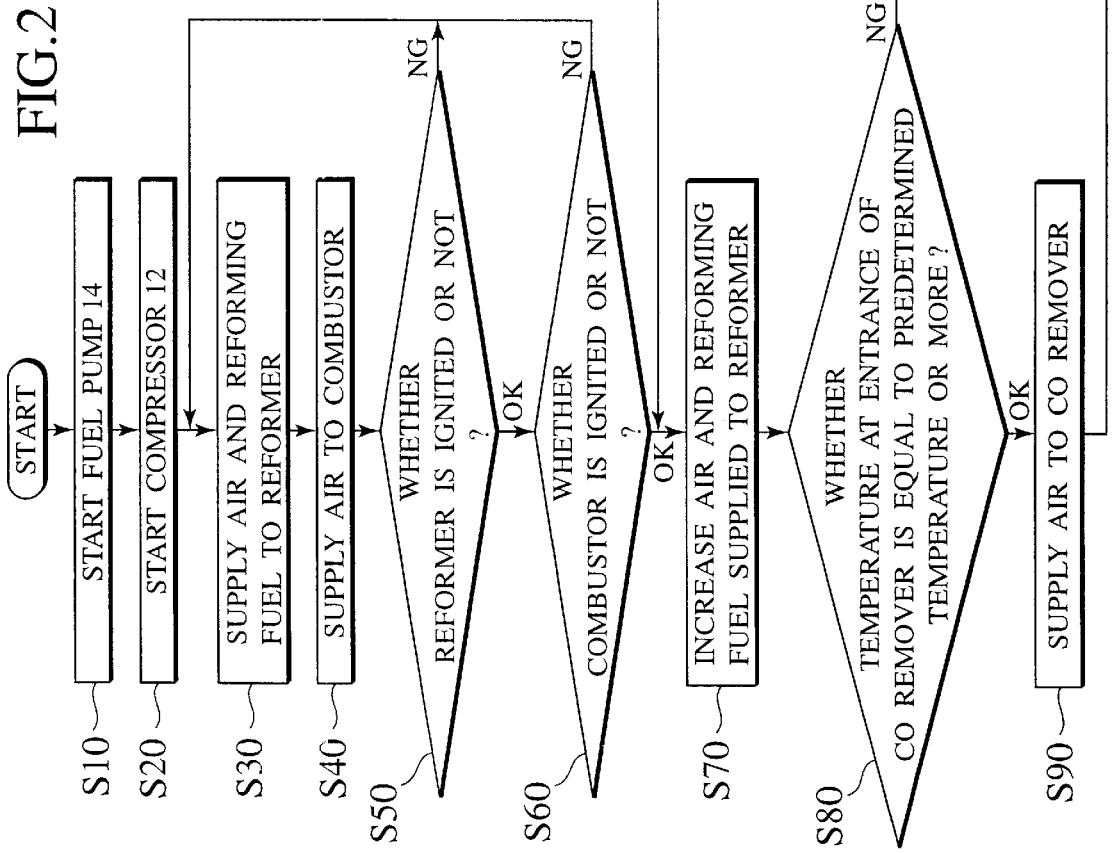

FIG. 2 is a flowchart showing starting procedures of the fuel cell system of this embodiment. First, after the pump 14 and the compressor 12 are started, the reforming fuel and the air are supplied to the reformer 11 while adjusting the flow rates of the reforming fuel and the air by the flow rate adjusting valves 15 and 32. Simultaneously with the supply of the reforming fuel and the air, the combustion air is supplied to the combustor 22 while adjusting the flow rates of the combustion air by the flow rate adjusting valve 24 (S10 to S40).

Although the reforming catalyst is in a normal temperature state in the reformer 11 to which the reforming fuel and the air are supplied, the partial oxidation reaction is started even in the normal temperature, and the reforming catalyst allows the reforming fuel and the air to generate the reforming gas while generating heat. The reforming catalyst is heated by the reforming gas and the heat energy which are generated by the partial oxidation reaction, and rises its temperature. Thus, the partial oxidation reaction is more occurred, thus rising the temperature multiplicatively.

Note that the confirmation of the ignition in the step S50 can be made by a rise in temperature of the entrance of the reformer 11 detected by the temperature sensor 25 provided in the entrance of the reformer 11.

The generated reforming gas flows into the combustor 22 while rising the temperature of the carbon monoxide remover 20. Note that, as described above, the three-way valve 21 is beforehand switched to the combustor 22 side in starting the fuel cell system 1, and the gas flowing out from the carbon monoxide remover 20 is entirely directed to the combustor 22.

Since the air has already been supplied to the combustor 22 by the operation of the step S40, the combustor 22 is easily ignited in spite that the combustion catalyst incorporated in the combustor 22 is in a normal temperature state. The high temperature combustion gas is supplied to the evaporator 19 while rising the temperature of the combustor 22 itself. Note that the ignition of the combustor 22 in the step S60 can be confirmed by the temperature sensor 27 provided in the entrance of the combustor 22. The combustion gas generated in the combustor 22 heats the evaporator 19, and then exhausted to the outside of the system.

After the ignitions of the reformer 11 and the combustor 22 are confirmed, quantities of the reforming fuel and the air supplied to the reformer 11 are increased in order to increase a heat value, in the step S70.

Subsequently, it is confirmed in the step S80 that a temperature of the entrance of the carbon monoxide remover 20 is risen to a predetermined value by the temperature sensor 26 provided in the entrance of the carbon monoxide remover 20. Here, if the carbon monoxide remover 20 is risen to the predetermined value in terms of the temperature, an oxidation reaction is possible by supplying the air to the carbon monoxide remover 20. Accordingly, after this confirmation, the oxidation air from the compressor 12 is supplied to the carbon monoxide remover 20 while adjusting the quantity of the oxidation air by the flow rate adjusting valve 23, in the step S90.

With the operations described above, exothermic reactions are performed in all of the reformer 11, the carbon monoxide remover 20 and the combustor 22.

Furthermore, since the quantity of the reforming gas generated increases with an increase in the feed rate of the reforming fuel in the step S70, the temperature of the combustion gas in the combustor 22 is measured by the temperature sensor 28 in the step S100, and the flow rate of the air supplied from the compressor 12 is adjusted to control the temperature of the combustor 22.

After rising the temperature continuously, the temperature of the exhaust gas is measured by the temperature sensor 29 provided in the exit of the evaporator 19. When the measured temperature reaches a predetermined value, it is judged in the step S110 that the rise of the temperature of the evaporator 19 is finished.

After the rise of the temperature of the evaporator 19 is confirmed, the three-way valve 33 is switched in the step S120, and thus the reforming fuel that has been supplied to the reformer 11 until this time is supplied to the evaporator 19. Furthermore, water is supplied to the evaporator 19 by starting the pump 17. Simultaneously with the supply of the water, in the step S130, supplying the air to the reformer 11, which has been supplied through the flow rate adjusting valve 32 is stopped. The reason why the supply of the air is stopped temporarily is that the catalyst is oxidized by the air when the supply of the reforming fuel is stopped, and catalytic activity is lowered.

Note that the reforming fuel gas vaporized in the evaporator 19 is supplied to the reformer 11 via the pipe, and the arrival of the reforming fuel gas at the reformer 11 in the step 140 is confirmed by a rise of a temperature detected by the temperature sensor 30, which is provided in the entrance of the reformer 11 (exit of the pipe).

When the arrival of the reforming fuel gas and the steam is confirmed, the air for use in the partial oxidation reaction is supplied from the compressor 12 to the reformer 11 via the flow rate adjusting valve 32 in the step S150. Accompanied with the supply of the air for use in the partial oxidation reaction, the partial oxidation reaction is resumed in the reformer 11 by the reforming fuel gas and the steam supplied from the evaporator 19 and the air from the compressor 12. Furthermore, though the combustor 22 continues to bum the reforming gas, the rise of the temperatures of the reforming catalyst, the combustion catalyst and the reactors is progressed. Accordingly, the temperatures of the reforming catalyst, the combustion catalyst and the reactors are detected by the respective temperature sensors 25 to 29, and the flow rate of the air is controlled so that a predetermined temperature condition is kept (step S160). As described above, the temperatures of the constituent components of the fuel cell system 1 reach the predetermined values, and the start of the fuel cell system 1 is finished.

According to this embodiment, the reforming fuel and the air are first supplied to the reformer 11, whereby it is possible to simultaneously rise temperatures of the reformer 11 and the combustor 22, which show large heat capacities and require a long time to rise the temperatures and to start. For this reason, the time required for rising the temperature can be shortened greatly compared to a constitution, as described in a conventional technology, in which the rise of the temperature of the reformer is started after the rise of the temperatures in the combustor and the evaporator.

In addition, the carbon monoxide remover is provided and hydrogen gas, removing fuel gas, and carbon monoxide are burnt, whereby the carbon monoxide remover is self-heated, so that, the carbon monoxide remover can be heated to a high temperature and started in a short time. As a result, it is possible to shorten the starting time of the fuel cell system.

Furthermore, since the evaporator and the like provided on the downstream of the combustor can be quickly heated to a high temperature, the whole of the reforming system can be heated to a high temperature and started in a short time. As a result, it is possible to shorten the starting time of the fuel cell system.

Furthermore, since the reforming fuel is burnt in the combustor 22 after being reformed to combustible gas by the partial oxidation using the reforming catalyst, the reforming fuel is burnt in the presence of the two catalysts, and the gasified reforming gas can be burnt in the combustor 22. Thus, it is possible to start the fuel cell system without emitting exhaust gas containing harmful components.

Second Embodiment

Figure 3:
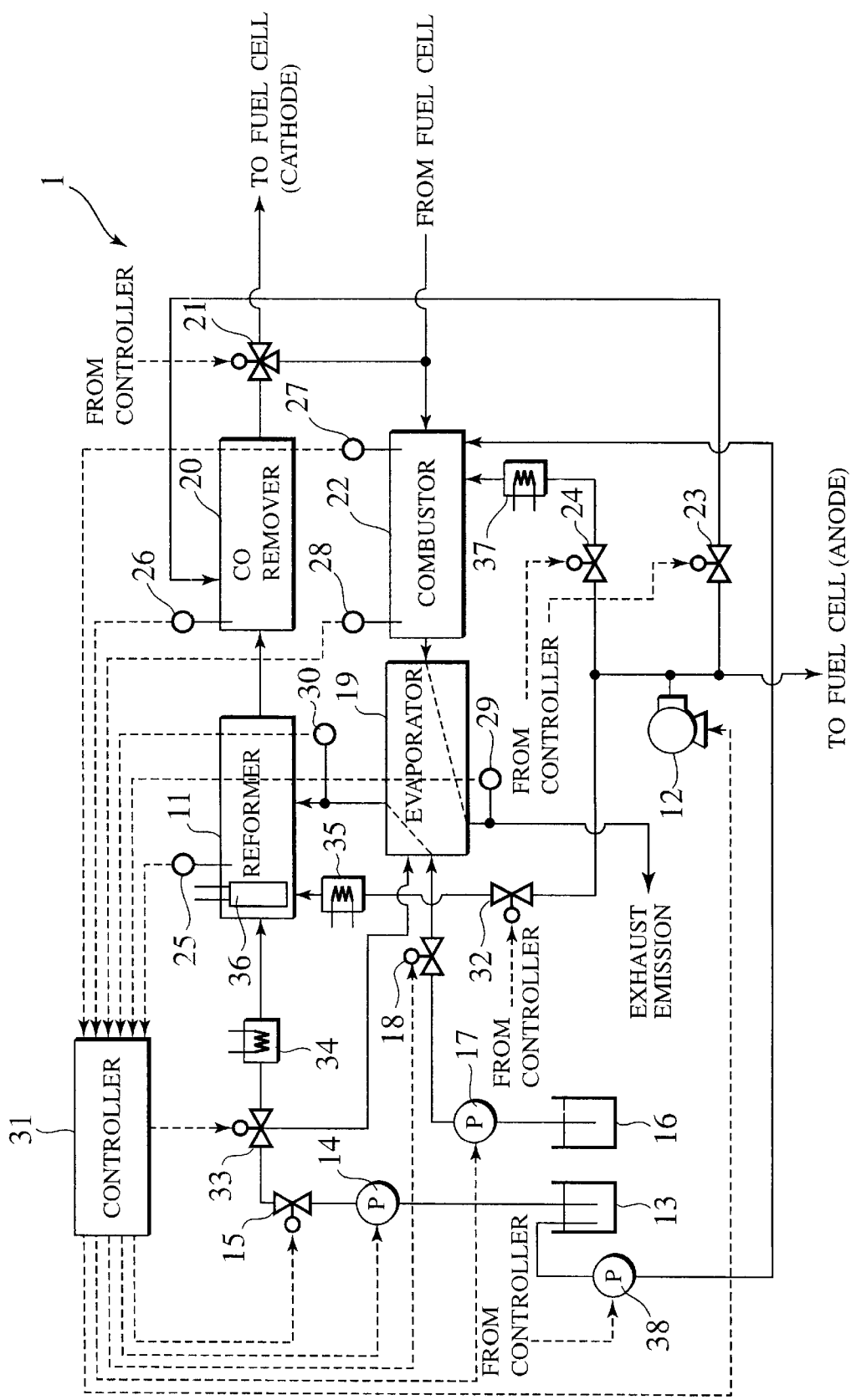
FIG. 3 is a block diagram showing another embodiment of a fuel cell system of the present invention.

FIG. 3 is a block diagram showing a second embodiment of the fuel cell system of the present invention. The second embodiment aims at achieving more excellent ignition characteristics of the combustor 22 and the reformer 11 compared to the foregoing first embodiment.

Specifically, to improve the ignition characteristic in the cold by the reforming fuel supplied from the pump 14 to the reformer 11 via the flow rate adjusting valve 15, the evaporator 34 heated by a heater is provided, and the heater 35 for heating air supplied to the reformer 11 from the compressor 12 is provided. The vaporized reforming fuel and the preheated air are supplied to the reformer 11, respectively.

Furthermore, a catalyst in a tip portion of the reforming catalyst in the reformer 11 is held on the surface of the heater 36, and a temperature of the catalyst in the tip portion of the reforming catalyst is risen by heating the heater 36, so that the ignition characteristic of the fuel cell system is improved.

Still furthermore, the air supplied to the combustor 22 is similarly preheated by the heater 37, and a good ignition characteristic can be obtained even in the cold.

In addition, the reforming fuel accommodated in the tank 13 is partially supplied to the combustor 22 using the pump 38.

Next, an operation of the fuel cell system will be described.

Figure 4:
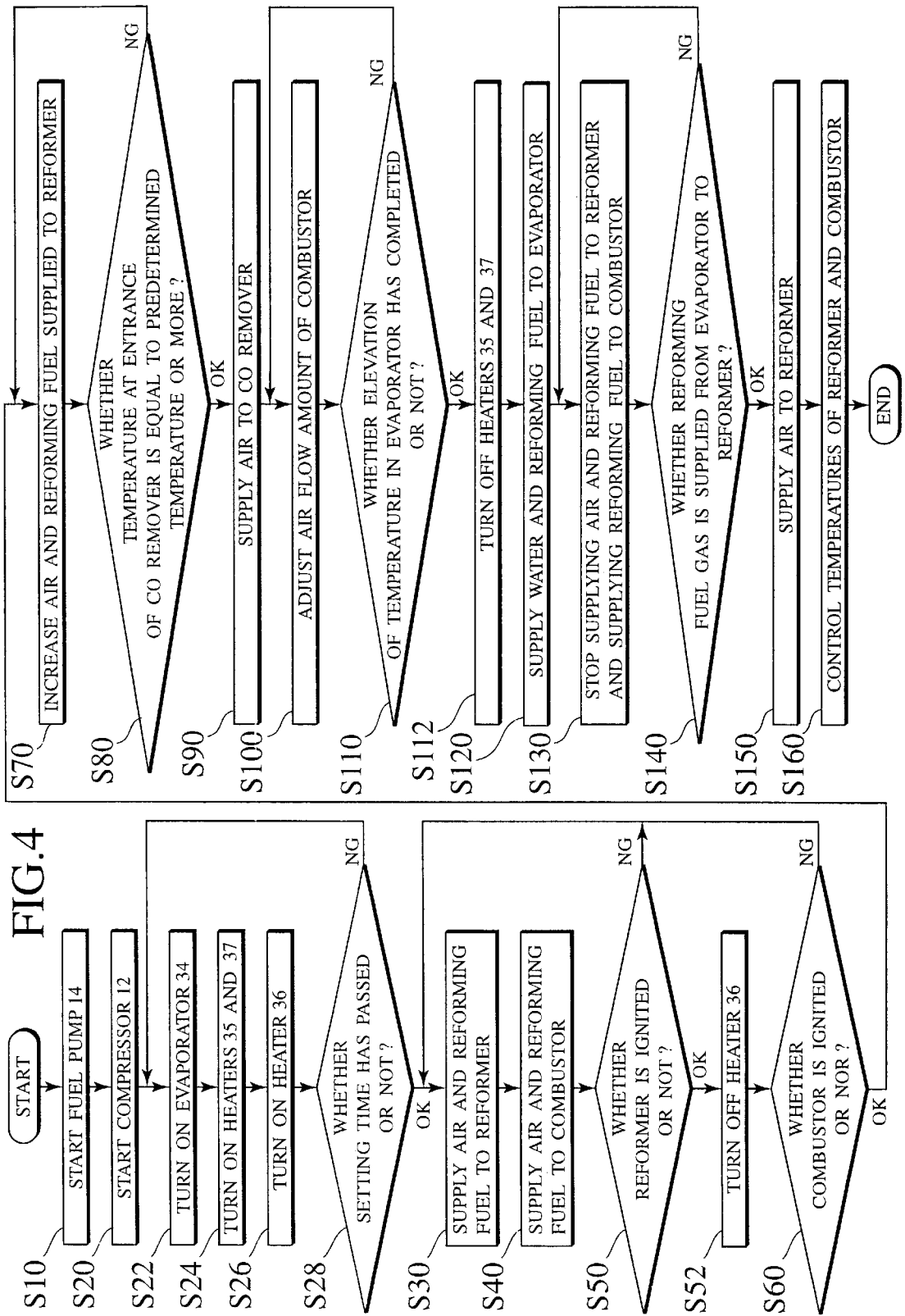
FIG. 4 is a flow chart showing starting procedures of the fuel cell system in FIG. 3.

FIG. 4 is a flowchart showing starting procedures of the fuel cell system of this second embodiment, and the fuel cell system of this embodiment differs from the fuel cell system of the first embodiment in the following points. Note that steps performing the same operations are denoted by the same reference numerals.

Specifically, after the compressor 12 is started, the evaporator 34 and the heaters 35, 36 and 37 are respectively started in the steps S22 to 26. After the start of the evaporator and the heaters, based on passage of a standard electrifying time that is previously set as a time required to rise the temperature of the heaters, it is decided that the rises in temperature of the heaters are completed (step S28), and the supply of the reforming fuel to the reformer 11 is begun.

With respect to the heater 36 provided in the reformer 11, the heater 36 is turned off after the passage of the previously set time after the ignition of the reforming catalyst is confirmed in the step S50 (step S52). Similarly, after the rise in temperature of the evaporator 22 is confirmed in the step S110, the heaters 35 and 37 which heat the air supplied to the reformer 11 and the combustor 22 are turned off (step S112).

In this embodiment, since the reforming fuel is directly supplied to the combustor 22 by the pump 38, heat energy generated by the combustion of the reforming fuel is added to heat energy of the reforming gas produced in the reformer 11. Accordingly, much quantity of heat can be obtained, and hence this fuel cell system can realize quicker starting. Note that the supply of the reforming fuel directly supplied to the combustor 22 by the pump 38 is stopped after the confirmation of the temperature rise in the evaporator 19 (step S130).

Furthermore, since it is possible to vaporize reforming fuel and water and it is possible to preheat air and a catalyst, the ignitions of the reformer 11 and the combustor 22 can be certainly performed even in the cold such as the winter season, and a reaction rate in ignition can be increased. Consequently, it is possible to more enhance exhaust performance and it is possible to shorten the starting time.

It should be noted that the above described embodiments are described for easiness of understanding the present invention, and not described to limit scope of the present invention. Accordingly, the constituent components disclosed in the above described embodiments include changes, modifications and equivalents belonging to the scope of the present invention.

The entire content of a Japanese Patent Application No. P2000-041192 with a filling date of Feb. 18, 2000 is hereby incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A fuel cell system comprising:
    a reformer generating a hydrogen-containing gas as a starting fuel;
    a controller controlling a ratio of an oxidizing agent to a reforming fuel via a flow rate adjusting valve when the oxidizing agent and the reforming fuel are supplied to said reformer; and
    a third heater in which a catalyst is held in an entrance of said reformer,
    wherein said controller controls the flow rate adjusting valve to supply said reformer with the reforming fuel and the oxidizing agent at a starting time of said fuel cell system, thereby promoting a self-heating by a partial oxidation reaction of the reforming fuel and the oxidizing agent, and thereby starting a rise in temperature of said reformer, and
    wherein the reforming fuel and the oxidizing agent are supplied to said reformer after a rise in temperature of said third heater is completed.

2. The fuel cell system according to claim 1, further comprising:
    a combustor; and,
    wherein said controller controls the flow rate adjusting valve to further supply said combustor with the reforming fuel and the oxidizing agent at the starting time of said fuel cell system, thereby promoting a self-heating by a partial oxidation reaction of the reforming fuel and the oxidizing agent, and thereby starting a rise in temperature of said combustor simultaneously with the rise in temperature of said reformer.

3. The fuel cell system according to claim 1, further comprising:
    at least one of first and second heaters, the first heater heating the reforming fuel to be supplied to said reformer and the second heater heating the oxidizing agent to be supplied to said reformer,
    wherein the rise in the temperature of said reformer is begun by first supplying gas vaporized by at least one of said first and second heaters to said reformer.

4. The fuel cell system according to claim 1, further comprising:
    a carbon monoxide remover for selectively oxidizing carbon monoxide,
    wherein after said reformer is ignited, the oxidizing agent is supplied to said carbon monoxide remover, and said carbon monoxide remover is self-heated by an oxidation reaction.

5. The fuel cell system according to claim 1, wherein the controller controls said flow rate adjusting valve to make the ratio of the oxidizing agent to the reforming fuel at the starting time of said fuel cell system larger than that at a normal operation.

6. A fuel cell system comprising:
    reforming means for generating a hydrogen-containing gas as a starting fuel;
    controlling means for controlling a ratio of an oxidizing agent to a reforming fuel via a flow rate adjusting valve when the oxidizing agent and the reforming fuel are supplied to said reforming means; and
    heating means in which a catalyst is held in an entrance of said reforming means,
    wherein said controlling means controls the flow rate adjusting valve to supply said reforming means with the reforming fuel and the oxidizing agent at a starting time of said fuel cell system, thereby promoting a self-heating by a partial oxidation reaction of the reforming fuel and the oxidizing agent, and thereby starting a rise in temperature of said reforming means, and
    wherein the reforming fuel and the oxidizing agent are supplied to said reforming means after a rise in temperature of said heating means is completed.

* * * * *